United States Patent
Norimatsu et al.

(10) Patent No.: US 9,806,622 B2
(45) Date of Patent: Oct. 31, 2017

(54) POWER CONVERSION DEVICE AND POWER CONVERSION CONTROL METHOD FOR THE SAME

(71) Applicant: Hitachi, Ltd., Chiyoda-ku, Tokyo (JP)

(72) Inventors: Yasuaki Norimatsu, Tokyo (JP); Akihiko Kanouda, Tokyo (JP); Yuuichi Mabuchi, Tokyo (JP); Tadahiko Chida, Tokyo (JP); Takuya Ishigaki, Tokyo (JP); Takae Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/159,018

(22) Filed: May 19, 2016

(65) Prior Publication Data

US 2016/0352229 A1 Dec. 1, 2016

(30) Foreign Application Priority Data

May 26, 2015 (JP) .................................. 2015-105980

(51) Int. Cl.
*H02M 3/335* (2006.01)
*H02M 7/49* (2007.01)
(Continued)

(52) U.S. Cl.
CPC ......... *H02M 3/33507* (2013.01); *H02J 3/385* (2013.01); *H02M 3/335* (2013.01);
(Continued)

(58) Field of Classification Search
CPC . H02M 2007/4811; H02M 2007/4815; H02M 2007/4818; H02M 2007/4822;
(Continued)

(56) References Cited

U.S. PATENT DOCUMENTS 9,287,803 B2* 3/2016 Mu .................... H02M 7/53871
2006/0233000 A1* 10/2006 Akagi ................. H02M 5/4585
363/37

(Continued)

FOREIGN PATENT DOCUMENTS

| CN | 101106335 A | 1/2008 |
| EP | 1 657 809 A1 | 5/2006 |
| JP | 2001-209445 A | 8/2001 |

OTHER PUBLICATIONS

Extended European Search Report issued in counterpart European Application No. 16171425.8 dated Oct. 14, 2016 (Nine (9) pages).
Schweizer, M., et al., "Comparison of the Chip Area Usage of 2-level and 3-level Voltage Source Converter Topologies", IECON 2010—36$^{th}$ Annual Conference on IEEE Industrial Electronics Society, IEEE, Piscataway, New Jersey, USA, Nov. 7, 2010, pp. 391-396, XP031840109 (Six (6) pages).

*Primary Examiner* — Emily P Pham
*Assistant Examiner* — Shahzeb K Ahmad
(74) *Attorney, Agent, or Firm* — Crowell & Moring LLP

(57) ABSTRACT

Reduction in size and weight of transformer for grid tie applications is demanded and can be achieved by applying SST to the transformer. However, SST application to PCS for sunlight requires the following: handle a wide variation range of the voltage of solar power generation; reduce switching losses of power devices, DC/DC converter and inverter, in the power circuit to implement high frequency for SST application; increase voltage to the grid voltage; and reduce the dimensions of the high current path prior to step-up. Thus, LLC resonant converter configuration is applied with an inverter placed in the output, and series connected configuration is applied to the inverter. The LLC resonant converter is subject to constant frequency regulation with large output, step-up control with low output, and step-down control with the upper limit voltage according to MPPT voltage from sunlight, in order to achieve drive loss reduction and voltage range handling.

8 Claims, 12 Drawing Sheets

(51) Int. Cl.
*H02J 3/38* (2006.01)
*H02M 7/5387* (2007.01)
*H02M 7/48* (2007.01)

(52) U.S. Cl.
CPC ........... *H02M 7/49* (2013.01); *H02M 7/5387* (2013.01); *H02M 7/4807* (2013.01); *Y02B 70/1433* (2013.01)

(58) Field of Classification Search
CPC ....... H02M 2007/4835; H02M 7/4826; H02M 7/487; H02M 7/49; H02M 7/5387; H02M 3/335; H02M 3/33507; H02M 1/32; H02M 2001/0003; H02M 2001/0022; H02M 3/33523; H02M 3/33538; H02M 3/337; H02M 7/42; H02M 7/4807; H02J 3/385; Y02B 70/10; Y02B 70/14; Y02B 70/1433; Y02B 70/1441; Y02B 70/1475

See application file for complete search history.

(56) References Cited

U.S. PATENT DOCUMENTS

| | | | |
|---|---|---|---|
| 2009/0303753 A1 | 12/2009 | Fu et al. | |
| 2012/0091817 A1 | 4/2012 | Seymour et al. | |
| 2014/0177286 A1* | 6/2014 | Sonobe | H02M 3/33507 363/21.01 |
| 2014/0306669 A1* | 10/2014 | Dai | H02M 3/33507 323/234 |
| 2014/0307482 A1 | 10/2014 | Chen et al. | |
| 2015/0333635 A1* | 11/2015 | Yan | H02M 3/33507 363/17 |
| 2016/0276964 A1* | 9/2016 | Zushi | B60L 11/1803 |

\* cited by examiner

FIG. 11

POWER CONVERSION DEVICE AND POWER CONVERSION CONTROL METHOD FOR THE SAME

BACKGROUND

The present invention relates to a power conversion device that converts DC power to AC power, as well as to a power conversion control method for the same.

The isolation transformer for grid tie applications is driven at a low frequency of several dozen Hz, which is the same as that of the grid, so there has been a problem that it is difficult to reduce the size and weight of the transformer. In recent years, the use of solid state transformer (SST) for high voltage and high power application has been studied. SST is the technology that replaces the conventional transformer by a combined configuration of a high frequency transformer and a power circuit such as DC/DC converter and inverter for driving the high frequency transformer to output AC of the same frequency as the conventional one at the output or input. By driving the high frequency transformer at a high frequency of several dozen to several hundred kHz, it is possible to significantly reduce its size and weight as compared to a single conventional transformer, even with the configuration of SST in which the power circuit is added.

The installation of solar electricity generation as power applications for grids has grown extensively worldwide, and there is a demand for a high performance power conditioning system (PCS) that controls the power of solar electricity generation and outputs to the grid. FIG. 2 shows a configuration of a conventional PCS for large power output. The PCS is a system with DC power of solar electricity generation as the input, converting DC to three-phase AC power by a three-phase inverter, increasing the three-phase AC voltage that is output from the PCS to a level from several hundred V to 6.6 kV or more by the use of a step-up transformer, and outputting to the grid. In order to output the maximum power of solar electricity generation to the grid, the PCS implements MPPT control. Since the voltage of solar power generation by the MPPT control varies significantly according to the weather, a step-up chopper is placed between the three-phase inverter and the solar power generation in order to handle the input voltage variation due to the MPPT control.

Japanese Unexamined Patent Application Publication No. 2001-209445 describes a grid-tie inverter device that maintains the operation frequency of a step-up converter approximately constant, even if the voltage of the DC input power supply is changed, to prevent an increase in noise and loss.

SUMMARY

In order to apply SST to achieve a smaller and lighter PCS, it is required to handle a wide range of variation of voltage of solar power generation, reduce the switching losses of the power devices used in the power circuit, such as DC/DC converter and inverter, to support high frequency implementation for SST application, and reduce the size and weight of a low-voltage high-current path from the three-phase inverter output terminal to the step-up transformer.

As for the voltage variation, in addition to the MPPT voltage range according to the weather as described above, there is also a voltage step-up by an open circuit voltage (OCV) in output stop. For the DC/DC converter and inverter within the conventional PCS, an electrolytic capacitor and a film capacitor are used, in which, however, it is necessary to use a high voltage capacitor so that the rated voltage of the capacitor does not exceed also in the voltage step-up operation. The capacitor has a tendency that the higher the withstand voltage the more the capacitance and allowable ripple current values of the capacitor decrease even with the same size. For this reason, it is desirable to reduce the rated voltage in order to reduce size and weight.

IGBT is typically used for power devices designed for the conventional PCS. The IGBT is an element suitable for high voltage in the range from several hundred V to several kV. However, switching at several kHz is realistic and it is necessary to develop a method for reducing the switching loss in order to drive at several kHz.

As described above, the output voltage of the three phase inverter, or several hundred V, is increased to 6.6 kV or more by the step-up transformer. For example, when the output voltage of the three-phase inverter is about 200 V, an output line that supports 2000 A or more is required for 1 MW output, and this makes the line and the step-up transformer primary side greater in order to handle high current. For this reason, reducing the output current is effective in the reduction of the size and weight.

Further, the PCS for large-scale applications is also required to have an output function that supports an overload of 100% or more. The high frequency implementation in the overload region will not increase the size of the cooler, so that it is effective in the reduction of the size and weight.

The present invention address the above problems by proposing a power conversion device that supports a wide range of voltages, reducing the switching loss associated with high frequency drive required due to SST adoption, and handling high current and overload, while achieving smaller device dimensions.

According to one aspect of the present invention, it is possible to reduce the switching loss of the power device due to high frequency implementation while at the same time reducing the voltage variation range. Further, by significantly reducing the output current value, a reduction in the size of the current path can also be achieved. Consequently, the conventional transformer designed for grid tie applications driven at a frequency as low as that of the grid can be replaced by SST. As a result, a smaller and lighter PCS can be achieved.

BRIEF DESCRIPTION OF THE DRAWINGS

FIG. 11 is a circuit diagram of the configuration of a second embodiment according to the present invention.

DETAILED DESCRIPTION

Hereinafter, embodiments of a power conversion device and a power conversion control method for the same according to the present invention will be described with reference to the accompanying drawings.

First Embodiment

First, the configuration of the present embodiment will be described below.

Figure 1:
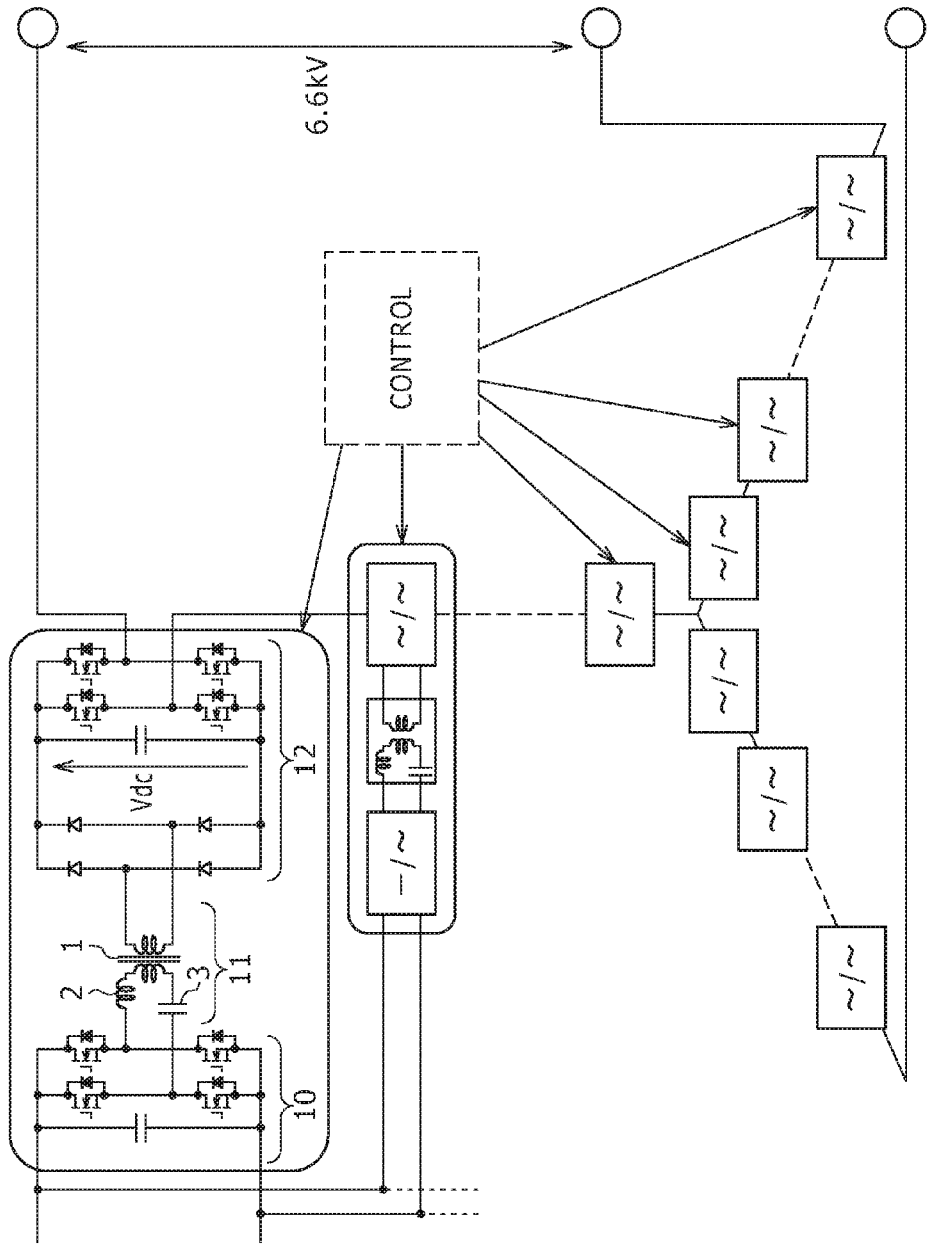
FIG. 1 is a circuit diagram of the configuration of a first embodiment according to the present embodiment.

FIG. 1 shows the configuration of the present embodiment.

It is assumed that the configuration of the present embodiment is designed for a several hundred kW to several MW class PCS that is tied to a high voltage (6.6 kV grid).

The circuit configuration of an H-bridge LLC resonant converter 10 is applied to a high frequency transformer 1, in which the DC output after H-bridge diode rectification is output as AC by an inverter 12 to the grid. It is designed to handle high voltage by the use of a series connected configuration in which the inverter 12 is connected in series, allowing a power semiconductor of low voltage such as 1700 V, 1200 V, and 650 V to be used for the inverter 12. The Vdc is also changed to a voltage corresponding to the power semiconductor, so that a low voltage capacitor can be used for the DC capacitor as well.

The voltage of the H-bridge LLC resonant converter 10 is as low as 1000 V or less, so that it is assumed to apply MOSFET that is suitable for high frequency drive. The switching frequency is assumed to be in the range from several dozen kHz to several hundred kHz. For the used MOSFET, SiCMOSFET that is suitable for high voltage and high frequency switching can be applied, or other transistors may also be used as long as they have the same function. The secondary side of the LLC resonant converter is assumed to be smoothed by the diode. In addition to Si diode, Si-type Schottky barrier diode or SiC Schottky barrier diode can be applied in order to reduce the conduction loss. Alternately, SiCMOSFET may be used synchronously to reduce the loss, or other diodes may also be used as long as they have the same function.

In order to achieve LCC resonance, a transformer 11 is connected to a leakage inductance Lr2, which is designed to resonate with an excitation inductance Lm of the high frequency transformer 1, as well as a resonance capacitor Cr3. The leakage inductance Lr2 may be integrated within the high frequency transformer as a structure that can adjust the constant of leakage flux within the high frequency transformer. It is assumed that a film capacitor is used for the resonant capacitor Cr3, but other capacitors may also be used as long as they have the same function. The isolation function will be described below.

Figure 3:
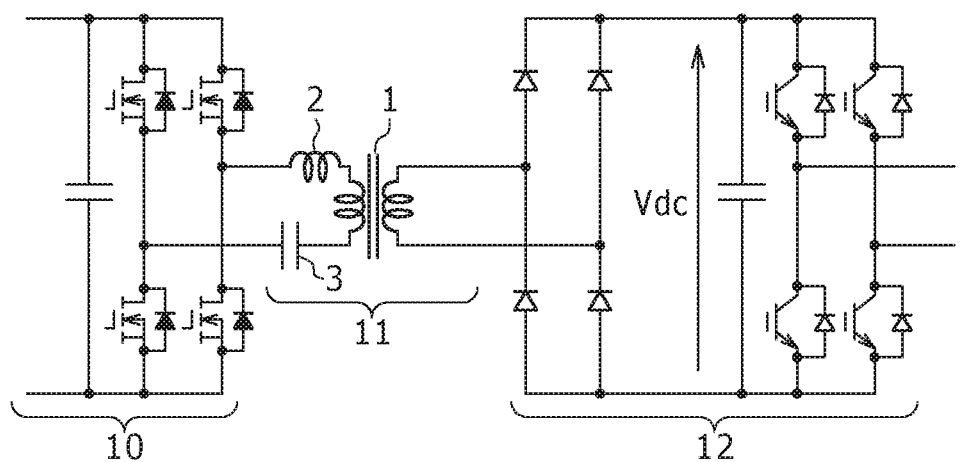
FIG. 3 is an open circuit diagram when the element is changed in the configuration of the first embodiment according to the present invention.

The inverter 12 as output is lower in the switching frequency of the series-connected PWM, which is several kHz or less in total, as compared to the drive frequency of the LCC resonant capacitor, so that an IGBT can be applied as shown in FIG. 3. As shown in FIG. 1, Si and SiC MOSFETs may be applied, or other transistors may also be used as long as they have the same function.

Figure 4:
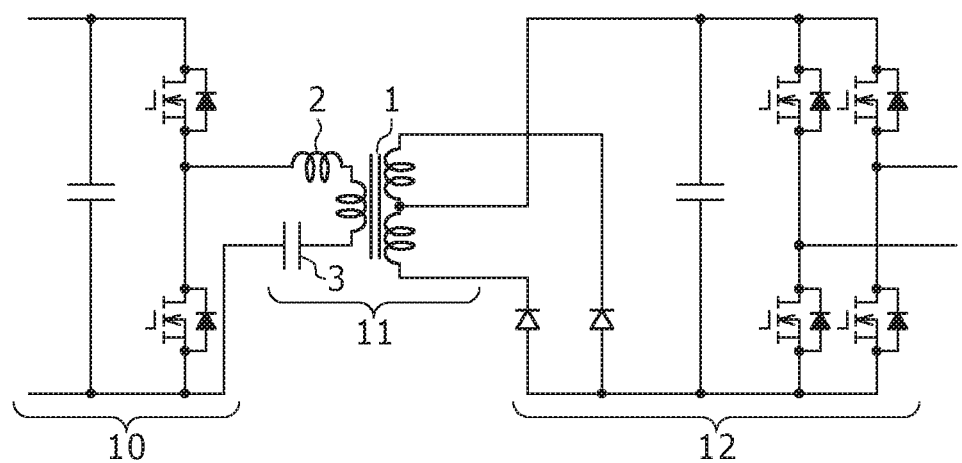
FIG. 4 is a circuit diagram of the configuration in which the number of used elements is reduced in the configuration of the first embodiment according to the present invention.

Further, FIG. 4 shows the case in which the number of drive elements of the LCC resonant converter 10 is reduced to half. The voltage range input to the high frequency transformer 1 on the primary side is half of the H-bridge configuration. However, this can be adjusted similarly by the turn ratio of the high frequency transformer.

Figure 2:
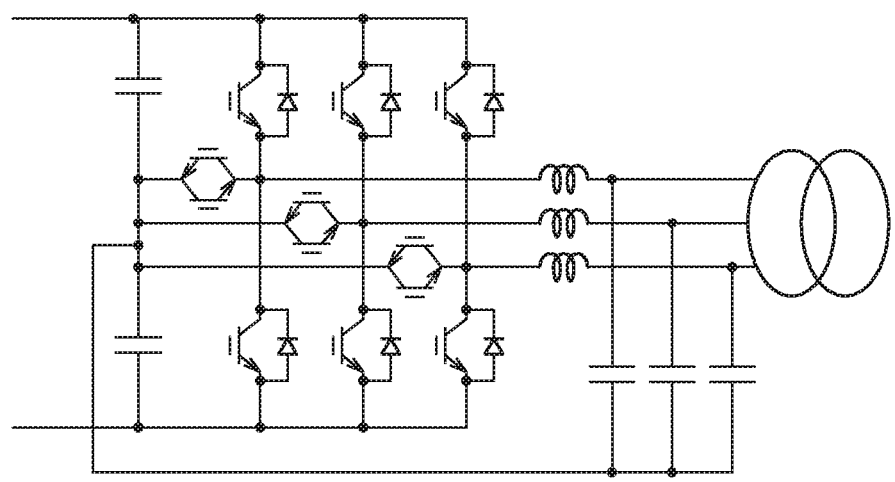
FIG. 2 is a circuit diagram of the configuration of a conventional PCS.

The series connected configuration assumes that the inverter 12 has up to about 8 to 6 series-connected stages per phase. In order to reduce the number of stages of the inverter 12, the use of a configuration of Y connection is considered, but it is also possible to achieve this by a configuration of $\Delta$ connection. In the case of the Y connection, the phase voltage is $1/\sqrt{3}$ with respect to the line voltage 6.6 kV. The DC voltage of all phases is based on the multiplier of $\sqrt{2}$. Thus, in the case of 8 stages, Vdc is 600 to 700 V and, as described above, the voltage of MOSFET that can be used for the inverter 12 is 1200 V. In this way, it is possible to achieve high voltage output with the low voltage element. While the voltage to ground for the LLC resonant converter 10 is 1000 V or less, the inverter 12 has a floating connection, so that the transformer 11 is considered to have an isolation function that supports 6.6 kV of the grid. By adopting the series connected configuration as described above, the need for the conventional voltage step-up in FIG. 2 is eliminated, allowing for significant reduction in the current path. As descried above, it is possible to reduce the current to about 152 A in the current path that has been required to carry about 2000 A in 1 MW output in the past. As a result, smaller size and lightweight can be achieved.

Next, the control method according to the present embodiment will be described.

Figure 10:
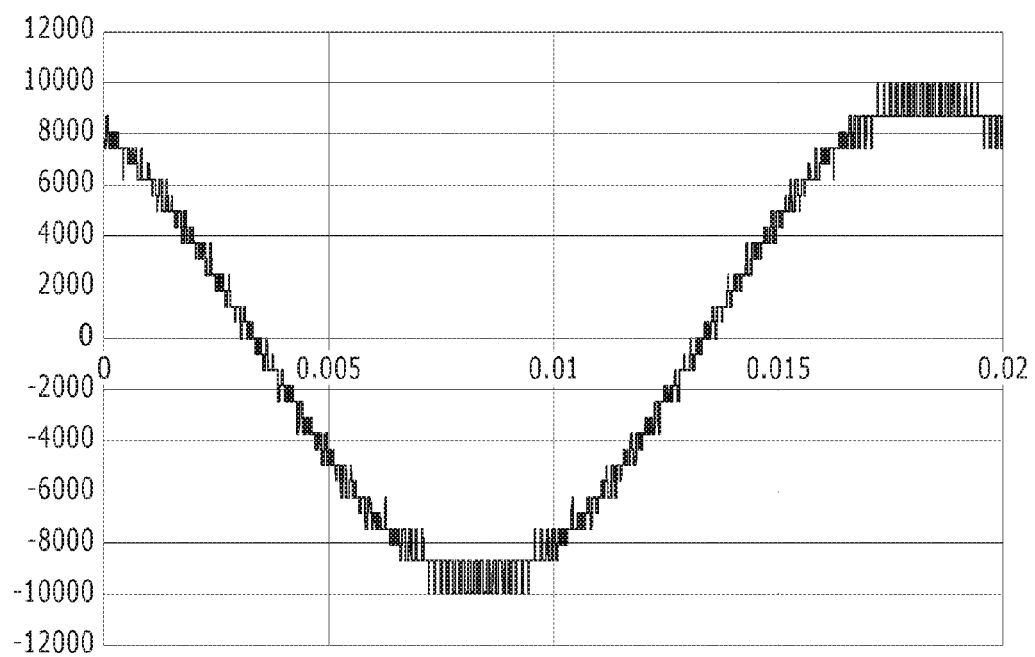
FIG. 10 is a diagram of an output waveform by a series-connected PWM control method according to the present invention.

First, as the whole output control method, FIG. 10 shows an example of the control output in the series connected configuration. This is the series-connected PWM method that performs PWM on only a part of each inverter stage, instead of performing the PWM control over the full range of voltages as in the case of the two-level invert. Since the lower the element voltage the smaller the switching loss tends to be, it is possible to achieve high efficiency by adopting this method. The modulation control is implemented in the central control according to the Vdc of each inverter 12.

Figure 5:
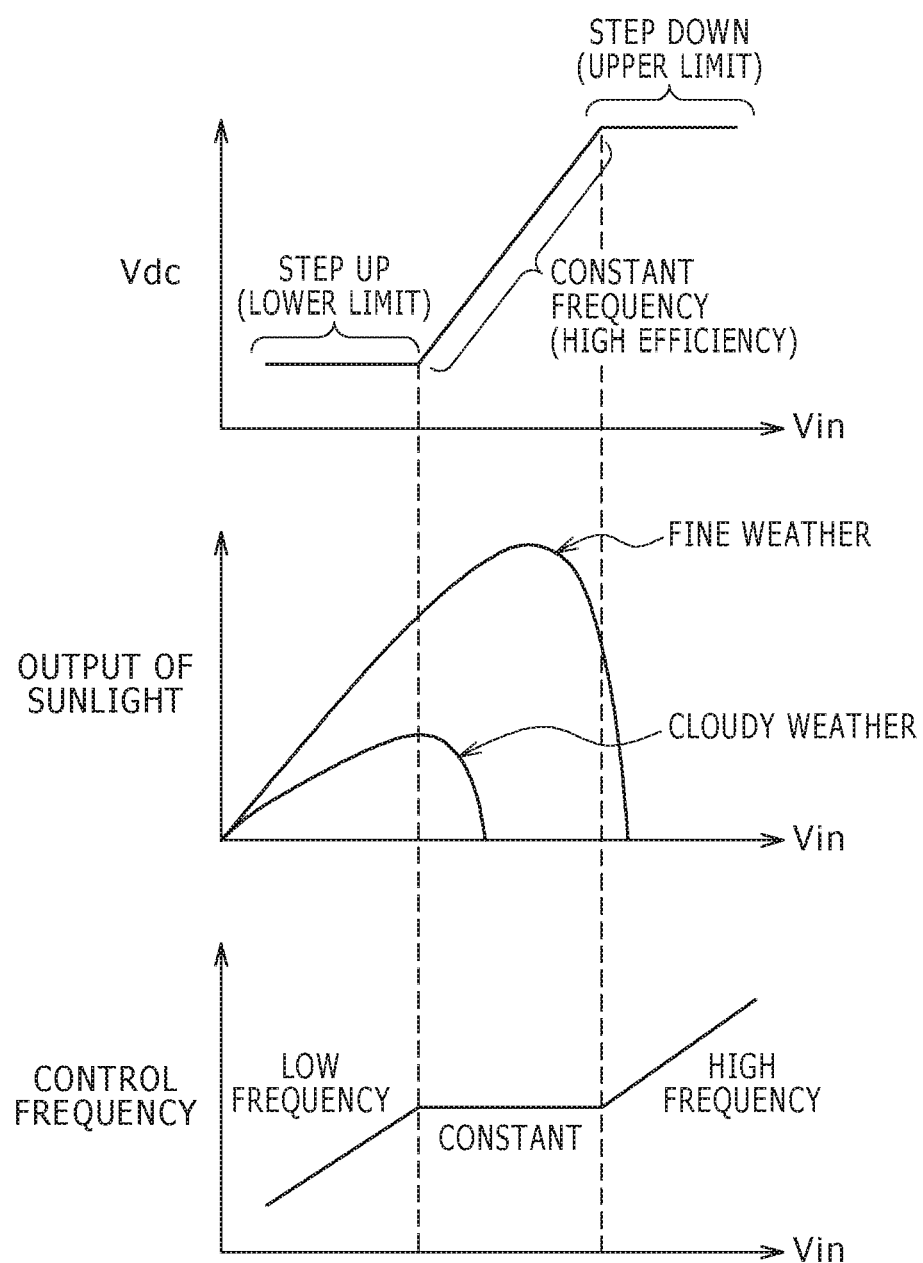
FIG. 5 is a diagram showing the control method of the first embodiment according to the present invention.

FIG. 5 shows the Vdc control method in each inverter 12 by the LLC converter 10 of this embodiment. With respect to the input voltage Vin from solar power generation, the solar power generation output changes as shown in the middle part of the graph. In the range corresponding to the maximum power point voltage under fine weather and cloudy weather (including rainy weather) conditions, the control frequency for driving the primary side MOSFET of the LLC resonant converter is set constant (for example, at 20 kHz). Then, the LLC resonant converter 10 is driven with a duty ratio of 50% (with dead time). In this case, the secondary side output voltage Vdc has a tendency to change in proportion to the input voltage. When the input voltage Vin is increased by OCV as it is in the inverter output stop, the control frequency is increased with the upper limit voltage of the input voltage Vin. Then, a voltage step-down control takes place with the duty ratio unchanged at 50% (with dead time) to prevent the Vdc voltage from rising. When the maximum power point voltage is further reduced due to lack of sunshine, the control frequency is reduced with the lower limit voltage of the input voltage Vin. Then, a voltage step-up control takes place with the duty ratio unchanged at 50% (with dead time) to prevent the Vdc voltage from decreasing.

The following description will focus on the switching loss of the LCC converter primary side MOSFET at each control frequency.

Figure 6:
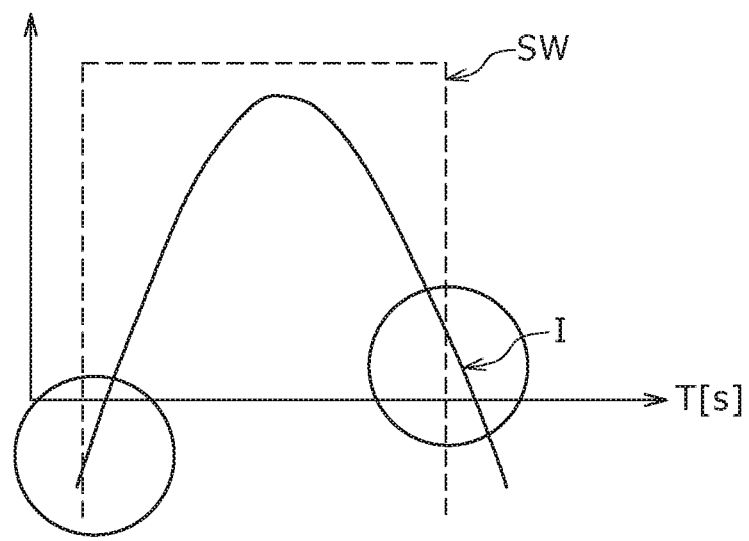
FIG. 6 is a diagram showing the relationship between the switching control voltage and the current waveform in constant frequency regulation of the first embodiment according to the present invention.

FIG. 6 shows the relationship between the drive voltage SW of the MOSFET and the current I flowing through the MOSFET in constant frequency regulation. When the MOSFET is in the ON state, the current I flows through the body diode of the MOSFET in the reverse direction, so that zero voltage switching (ZVS) occurs and no switching loss occurs in the ON state. In the OFF state, the current I peaks out and is reduced to a sufficiently low level, so that the switching loss is also reduced in the OFF state. As a result, it is possible to achieve highly efficient switching by the constant frequency regulation.

Figure 7:
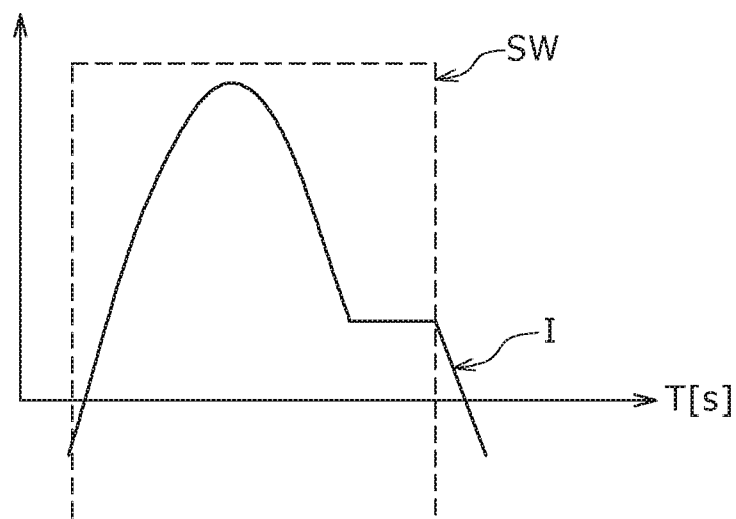
FIG. 7 is a diagram showing the relationship between the switching control voltage and the current waveform in voltage step-up control of the first embodiment according to the present invention.

FIG. 7 shows the relationship between the drive voltage SW of the MOSFET and the current I flowing through the MOSFET in the voltage step-up control. When the MOSFET is in the ON state, the current I flows through the body diode of the MOSFET in the reverse direction, so that ZVS occurs and no switching loss occurs in the ON state. In the OFF state, current flows due to the leakage inductance Lr2, so that the loss of the current I is increased compared to the current loss in the constant frequency regulation. Nevertheless, thanks to the reduced frequency, highly efficient switching can be achieved.

Figure 8:
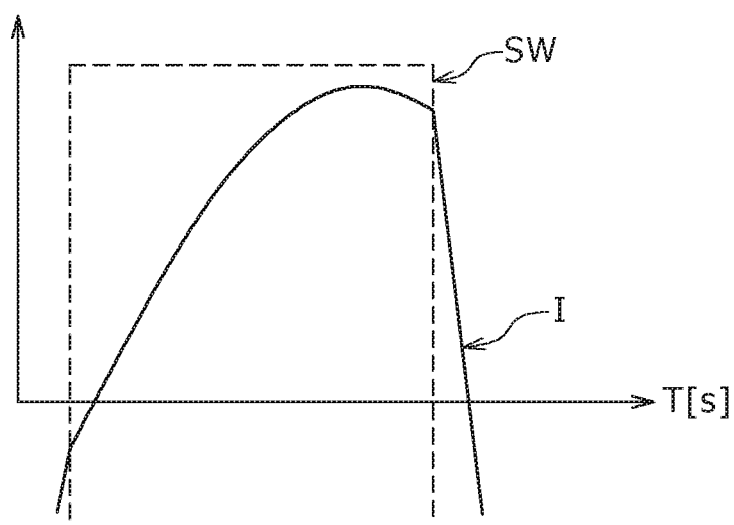
FIG. 8 is a diagram showing the relationship between the switching control voltage and the current waveform in voltage step-down control of the first embodiment according to the present invention.

FIG. 8 shows the relationship between the drive voltage SW of the MOSFET and the current I flowing through the MOSFET in the voltage step-down control. When the MOSFET is in the ON state, the current I flows through the body diode of the MOSFET in the reverse direction, so that zero voltage switching (ZVS) occurs and no switching loss occurs in the ON state. In the OFF state, the current I is almost blocked in the vicinity of the peak and the loss is large. The frequency is further increased, so that the drive control method has significant switching losses.

As described above, because the range of large outputs in the MPPT range is subject to the constant frequency regulation, highly efficient control can be achieved. Further, in the case of low output with low sunshine exposure, the voltage step-up control takes place, so that the control method has high efficiency even in the low output range in which the switching loss increases relative to the conduction loss. As a result, it is possible to achieve high efficiency in the whole exposure of sunlight. Furthermore, the range of less efficient voltage step-down control is also subject to the OCV control of sunlight. Thus, there is no influence on the output efficiency, and the influence on the secondary side capacitor voltage tends to be reduced as well.

Needless to say, it is possible to slightly change the frequency of the constant frequency regulation part, or it is possible to slightly change the output voltage instead of being constant in the voltage step-down and step-up controls. Also in the case of changing the frequency, it is possible to obtain the effect of switching loss reduction.

Figure 9:
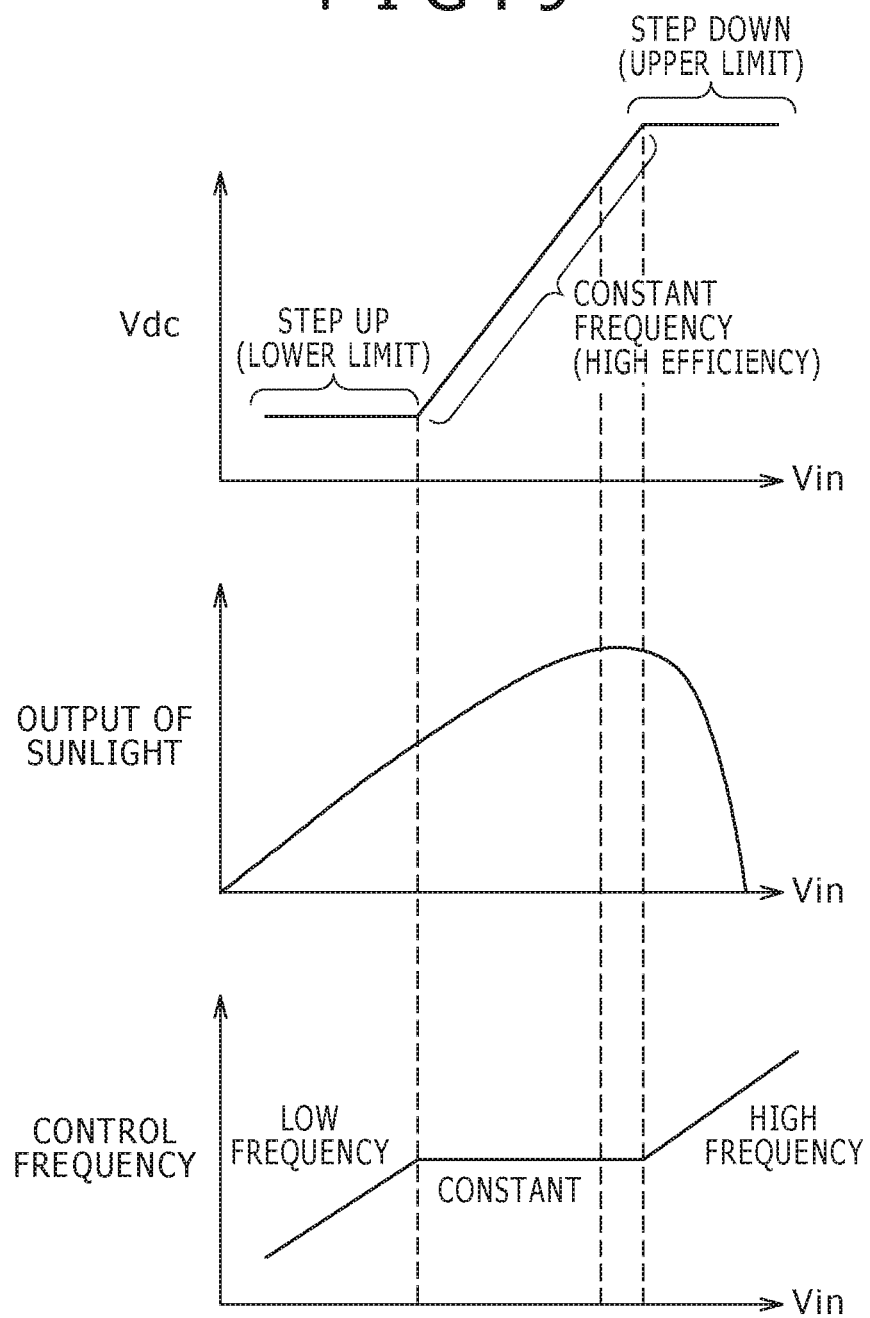
FIG. 9 is a diagram showing the control method in an overload instruction according to the present invention.

Next, FIG. 9 shows the control method for overload instruction that is different from the normal operation. This control is performed according to an overload instruction in the state in which the maximum value of the solar power generation output exceeds the constant frequency regulation region and the voltage step-down control takes place at 100% load. In response to the overload instruction, the normal Vdc of the inverter 12 is further increased to increase the constant frequency region. The overload instruction is a very short time operation during the course of a year, so that the influence on the life of the capacitor or other components due to Vdc rise in the inverter 12 is very small, in which the constant frequency regulation takes place. Thus, highly efficient control can be achieved.

Second Embodiment

Figure 11:
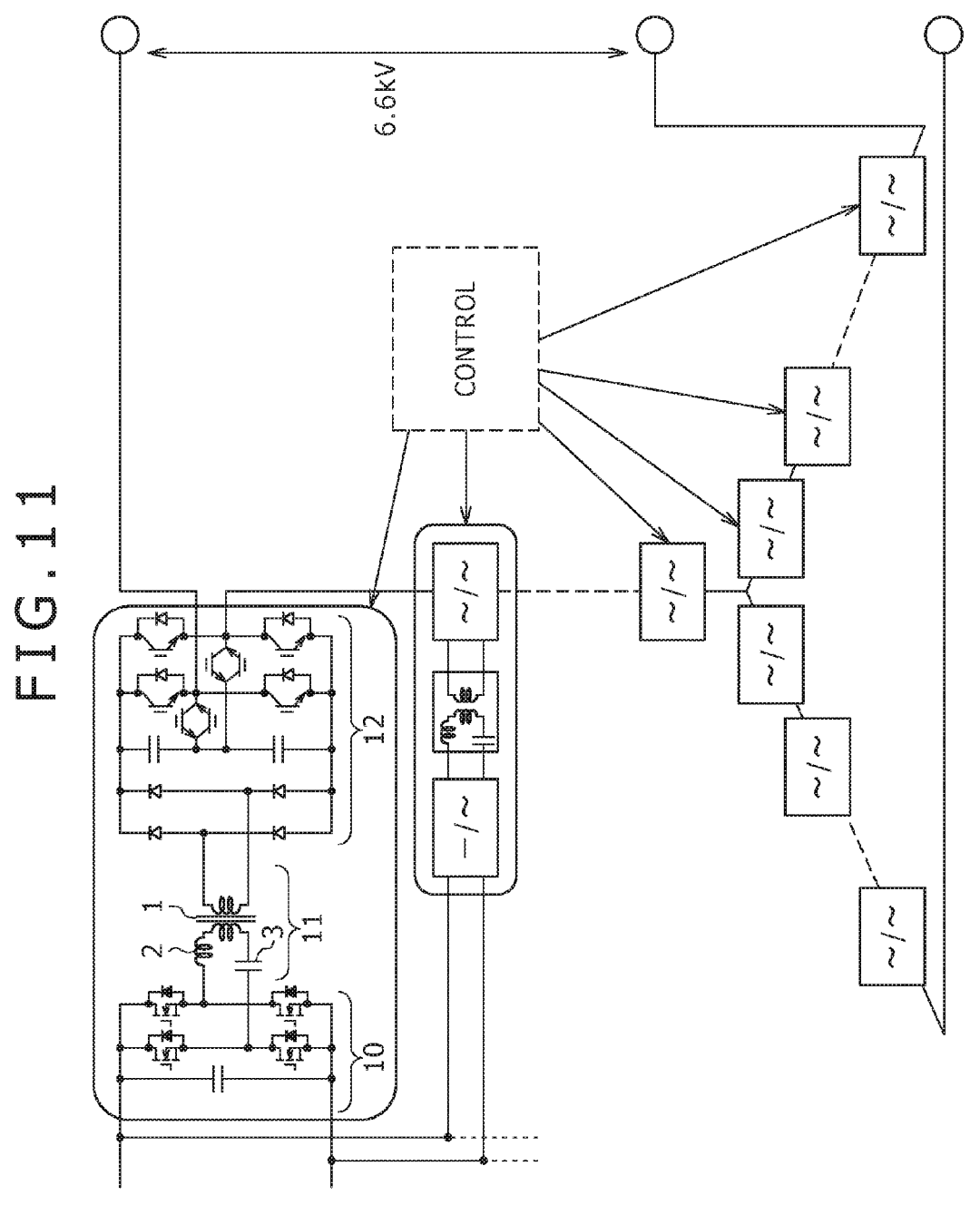

FIG. 11 shows the configuration of the present embodiment.

It is assumed that the configuration of the present embodiment is designed for a several hundred kW to several MW class PCS that is tied to a high voltage (6.6 kV grid).

The circuit configuration of the H-bridge LLC resonant converter 10 is applied to the high frequency transformer 1, in which the DC output after H-bridge diode rectification is output as AC by the inverter 12 to the grid. It is designed to handle high voltage by using a series connected configuration in which the inverter 12 is connected in series, allowing a power semiconductor of low voltage such as 1700 V, 1200 V, and 650 V to be used for the inverter 12. The Vdc is also changed to a voltage corresponding to the power semiconductor, so that a low voltage capacitor can be used for the DC capacitor as well.

Figure 12:
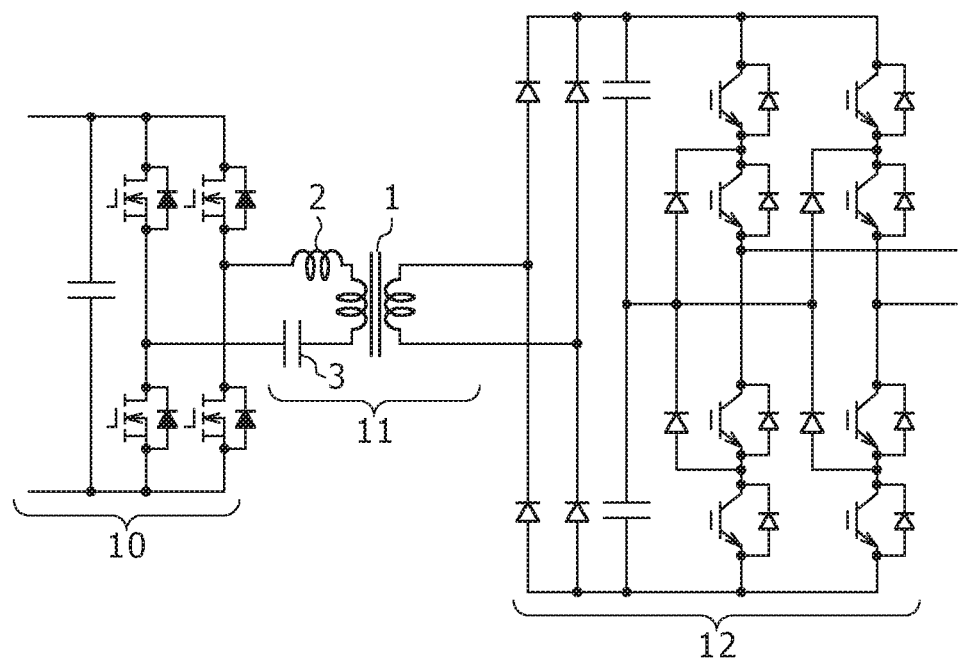
FIG. 12 is a diagram showing the case in which another circuit is applied to the configuration of the second embodiment according to the present invention.

In the present embodiment, a three-level inverter is applied to the inverter 12. The three-level inverter may have a circuit configuration using six elements per arm as shown in FIG. 12, or a circuit configuration using four elements per phase as shown in FIG. 11. The inverter 12 as output is lower in the switching frequency of the series-connected PWM, which is several kHz or less in total, as compared to the drive frequency of the LCC resonant capacitor, so that an IGBT may be applied as shown in FIG. 11. Si and SiC MOSFETs may be applied, or other transistors may also be used as long as they have the same function The H-bridge LLC resonant converter 10 is a lower voltage of 1000 V or less, it is assumed to apply MOSFET that is suitable for high frequency drive. The switching frequency as assumed to be in the range from several dozen kHz to several hundred kHz. For the used MOSFET, SiC-MOSFET that is suitable for high voltage and high frequency switching may be applied, or other transistors may also be used as long as they have the same function. The secondary side of the LLC resonant converter is assumed to be smoothed by the diode. In addition to Si diode, Si type Schottky barrier diode or SiC Schottky barrier diode may be applied in order to reduce the conduction loss. Alternately, SiCMOSFET may be used synchronously to reduce the loss, or other diodes may also be used as long as they have the same function.

In order to achieve LLC resonance, the transformer 11 is connected to the leakage inductance Lr2, which is designed to resonate with the excitation inductance Lm of the high frequency transformer 1, as well as the resonant capacitor Cr3. The leakage inductance Lr2 may be integrated within the high frequency transformer as a structure that can adjust the constant of leakage flux within the high frequency transformer. It is assumed that a film capacitor is used for the resonant capacitor Cr3, but other capacitors may also be used as long as they have the same function. The isolation function will be described below.

The series connected configuration assumes that the inverter 12 has up to 4 to 3 series-connected stages per phase. In the first embodiment, a single phase inverter is used. However, in the present embodiment, a three-level inverter is applied, so that the output of the inverter 12 is equivalent to that corresponding to the two stages in the first embodiment. In order to reduce the number of stages of the inverter 12, the use of a configuration of Y connection is considered, but it is also possible to achieve this by a configuration of Δ connection. In the case of the Y connection, the phase voltage is $1/\sqrt{3}$ with respect to the line voltage 6.6 kV. The DC voltage of all phases is based on the multiplier of $\sqrt{2}$. Thus, in the case of 4 stages, Vdc is 1200 to 1400 V. As described above, the voltages of IGBT that can be used for the inverter 12 are 1200 V with six elements per arm and 1700 V with four elements per arm. In this way, it is possible to achieve high voltage output with the low voltage elements. While the voltage to ground for the LLC resonant converter 10 is 1000 V or less, the inverter 12 has a floating connection, so that the transformer 11 is considered to have an isolation function that supports 6.6 kV of the grid. By adopting the series connected configuration as described above, the need for the conventional voltage step-up in FIG. 2 is eliminated, allowing for significant reduction in the current path. As descried above, it is possible to reduce the current to about 152 A in the current path that has been required to carry about 2000 A in 1 MW output in the past. As a result, smaller size and lightweight can be achieved Next, the control method according to the present embodiment will be described.

First, as the whole output control method, FIG. 10 shows an example of the control output in the series connected configuration. This is the series-connected PWM method that performs PWM on only a part of each inverter stage, instead of performing the PWM control over the full range of voltages as in the case of the two-level inverter. Since the lower the element voltage the smaller the switching loss tends to be, it is possible to achieve high efficiency by adopting this method. The modulation control is implemented in the central control according to the Vdc of each inverter 12.

Further, in the present embodiment, the three-level inverter is applied to the inverter 12, so that the control for two stages in the first embodiment can be performed within each inverter 12. As the control method, the PWM control may be performed point by point according to an instruction of the central control, or may be implemented as a distributed processing within each inverter 12. The communication time of the central control can be shorter in the distributed processing than the communication time of the point-by-point control.

For the Vdc control method in each inverter 12 by the LLC converter 10 of the present embodiment, it is assumed that the normal and overload controls are performed in the same manner as the control method in the first embodiment.

The above description has focused on two embodiments. However, it goes without saying that any combination of the contents described in the above embodiments may also be used according to the application.

What is claimed is:

1. A power supply device for solar power generation, comprising:
    a DC/DC converter of LLC resonant type; and
    an inverter connected to the DC/DC converter,
    wherein the inverter output terminal is connected in series;
    wherein the DC/DC converter, when an input voltage of the DC/DC converter is smaller than a first predetermined voltage value, is configured to perform a step up operation so that the output voltage of the DC/DC converter output to the inverter is a first fixed value, and
    wherein the DC/DC converter, when the input voltage of the DC/DC converter is greater than a second predetermined voltage value that is set to a value greater than the first predetermine voltage value of the DC/DC converter, is configured to perform a step down operation so that the output voltage of the DC/DC converter output to the inverter is a second fixed value that is different from the first fixed value;
    wherein when the input voltage of the DC/DC converter is increased, a control frequency for driving the DC/DC converter is increased, and when a maximum power point voltage of the power supply device is reduced, the control frequency is reduced.

2. The power supply device according to claim 1, wherein the inverter output terminal is connected in series with a Y connection.

3. The power supply device according to claim 1, wherein the DC/DC converter that, when an input value of the DC/DC converter is equal to or more than a first predetermined voltage value and is equal to or less than a second predetermined voltage value, performs an operation so that the operation frequency of the DC/DC converter is a fixed value.

4. The power supply device according to claim 1, wherein the DC/DC converter that, when an input voltage of the DC/DC converter is equal to or more than a first predetermined voltage value and is equal to or less than a second predetermined voltage value, performs an operation so that the operation frequency of the DC/DC converter is changed from a step-up frequency to a step-down frequency.

5. The power supply device according to claim 1, wherein the DC/DC converter increases a second predetermined voltage value based on an overload instruction, to increase a voltage range in which an operation frequency of the DC/DC converter is a fixed value.

6. The power supply device according to claim 1, wherein a two-level inverter configuration is applied to the inverter.

7. The power supply device according to claim 1, wherein the inverter has a three-level inverter configuration.

8. The power supply device according to claim 7, wherein the three-level inverter configuration is changeable to a different three-level inverter configuration.

* * * * *